Dec. 27, 1966 H. SUSSKIND ETAL 3,294,645
CONTROLLED UNLOADING OF GEOMETRICALLY ORDERED PACKED BEDS
Filed April 22, 1966 2 Sheets-Sheet 1

INVENTORS
HERBERT SUSSKIND
WALTER W. BECKER
MICHAEL W. MARESCA
DECEASED, BY
MARIE MARESCA, ADMINISTRATRIX

United States Patent Office 3,294,645
Patented Dec. 27, 1966

3,294,645
CONTROLLED UNLOADING OF GEOMETRICALLY
ORDERED PACKED BEDS
Herbert Susskind, Huntington, N.Y., Walter W. Becker, Shoreham, N.Y., and Michael W. Maresca, deceased, late of East Patchogue, N.Y., by Marie Maresca, administratrix, East Patchogue, N.Y., assignors to the United States of America as represented by the Atomic Energy Commission
Filed Apr. 22, 1966, Ser. No. 545,803
1 Claim. (Cl. 176—73)

The invention described herein was made in the course of, or under a contract with the U.S. Atomic Energy Commission.

The present invention concerns the unloading of ordered packed beds and more particularly the use of hydraulic techniques for the controlled and selective unloading of ordered packed beds of spheres.

In the fast nuclear reactor covered in U.S. patent application Ser. No. 519,162 filed on January 6, 1966, in the names of Warren E. Winsche and Melvin M. Levine, entitled "Countercurrent Breeder Reactor," the fuel is shuffled within the core at regular intervals to maintain a predetermined relationship of fertile material, fissile material and reactivity at any given instant and location in the core. A fuel arrangement which is capable of such use in the aforementioned reactor consists of ordered packed bed assemblies of spherical fuel elements or balls as described in U.S. patent application Ser. No. 457,536 entitled "Ordered Bed Nuclear Fuel Assemblies," filed on May 20, 1965, in the name of Warren E. Winsche, now Patent No. 3,262,857, issued July 26, 1966. Removal of the fuel elements from the containers can be accomplished by opening the floor supporting the bed of elements in the container so that the elements can be permitted to flow out under the influence of gravity.

The nuclear reactor described in the aforementioned "Countercurrent Breeder Reactor" requires the progressive movement of fuel from the extremities of the core towards the central region as the plutonium concentration builds up in the fuel. In the course of the operating life of the reactor this means that the fuel elements would be moved regularly and perhaps frequently. Under these conditions, mechanical handling of the fuel balls would be slow, inefficient and complex. In addition, there is the problem of removing heat and fission products from the fuel balls while outside of the reactor or in transit.

In order to avoid these difficulties and other problems which would be encountered by the mechanical handling of large numbers of spherical fuel elements, this invention provides a completely different approach utilizing hydraulic handling of the elements instead of purely mechanical means. In accordance with this invention, the fuel balls are introduced into the packed bed by way of a liquid carrier, are removed by selective fluidization of the uppermost layers of the balls, and are collected and classified for storage and use or re-use in the fuel containers or elsewhere. Hydraulic handling of the fuel balls can be carried out either directly inside the reactor vessel or in an external hot cell. In either case, this invention has the advantage of providing for more rapid and safe handling of the fuel as well as affording greater flexibility and efficiencies than heretofore obtainable. Furthermore, the liquid carrier provides a convenient mechanism for removing heat and fission products while the fuel balls are being handled and stored.

It is thus a first object of this invention to provide improved handling of the fuel in an ordered packed bed nuclear reactor.

It is another object of the invention to provide for the improved handling of the spherical particles in any ordered packed bed.

Another object is a hydraulic arrangement for the unloading of ordered packed beds of spherical particles.

Other objects and advantages of this invention will hereinafter become readily apparent from the following description of preferred embodiments of this invention taken with reference to the accompanying drawings in which.

Figure 1:
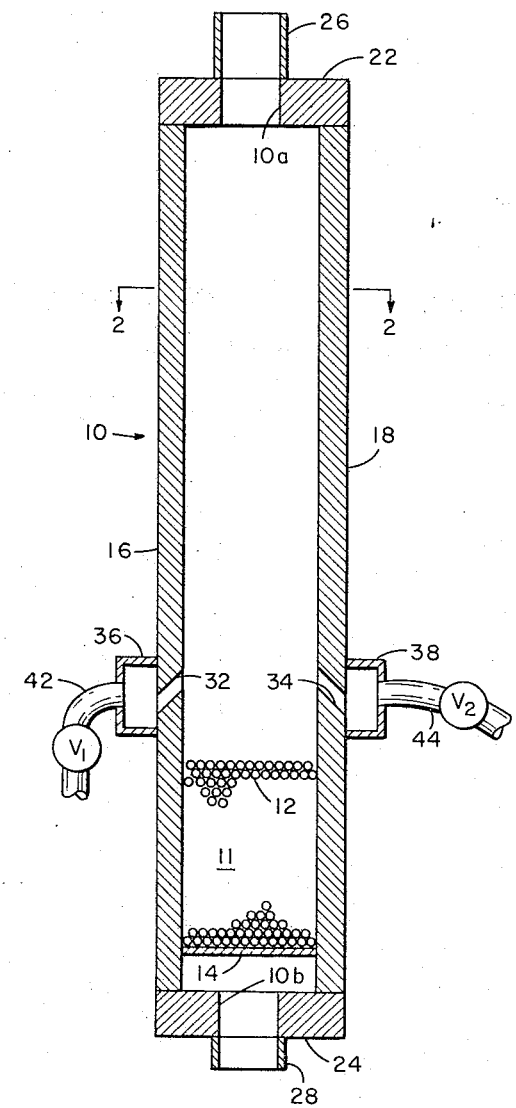
FIG. 1 is an elevation view in section of a column containing spherical elements and embodying the principles of this invention.
Figure 2:
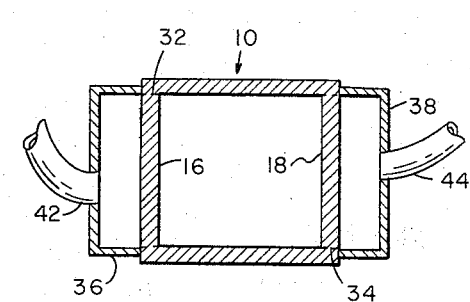
FIG. 2 is a view along 2—2 of the column illustrated in FIG. 1.

Referring to FIGS. 1 and 2 there is shown a vertical column 10 which is rectangular in cross-section and contains a bed 11 of spherical particles 12 supported by a perforated plate 14 as described in the previously mentioned Patent No. 3,262,857 to establish the ordered packed bed as therein described. Column 10, which may be a fuel assembly for a nuclear reactor, consists of a pair of oppositely facing walls 16 and 18, upper and lower end pieces or caps 22 and 24, and upper and lower nozzles 26 and 28 for permitting flow of fluids therethrough. Upper and lower caps 22 and 24 are provided with openings 10a and 10b, respectively, to permit communication between the interior of column 10 and upper and lower nozzles 26 and 28, respectively.

Located at the same elevation or a short distance above the upper level of bed 11 are a pair of rectangular nozzles 32 and 34 in walls 16 and 18, respectively, of column 10. Nozzles 32 and 34 extend upwardly in an inwardly direction, as illustrated, and extend along the entire width of their respective walls, as shown in FIG. 2. A pair of manifolds 36 and 38 located outside column 10 completely enclose the outside entrances to nozzles 32 and 34, respectively. Manifold tubes 42 and 44 provide communication into manifolds 36 and 38, respectively. Valves $V_1$ and $V_2$ in manifolds 42 and 44 respectively, permit fluid flow to be varied as desired.

In the operation of the apparatus described, it is desired to remove particles 12 within column 10 in such a way that after removal it is possible to arrange them according to their vertical position in column 10. A liquid which may be the coolant in the reactor or any other suitable liquid such as water is supplied under pressure to column 10 by way of tubes 42 and 44, manifolds 36 and 38, and nozzles 32 and 34. As column 10 becomes filled with the liquid, a form of turbulence to be later described will be generated within column 10 above bed 11 due to the manner in which the liquid is jetted into the interior of column 10. As the pressure is increased within manifolds 36 and 38 the velocity of the liquid jets through nozzles 32 and 34 will be increased. Eventually it will be found that the first layer of particles will be fluidized and carried away by the liquid leaving column 10 through exit nozzle 26. By increasing the pressure of the liquid further the next layer will become fluidized and carried away. In this way, by gradually increasing the pressure of the liquid supplied to manifold 10 it is possible selectively and sequentially to remove predictably and in an orderly fashion the particles within column 10. An additional advantage of this invention when embodied into a nuclear reactor is that the liquid can be used simultaneously as a means for carrying away heat of fission and fission products while the particles are in transit and stored.

Figure 3:
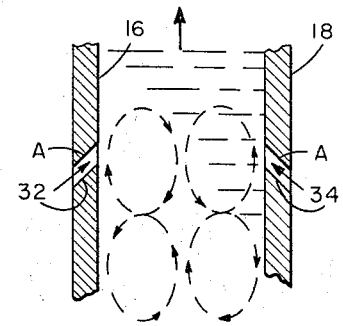
FIG. 3 is a schematic view of the interior of column FIG. 1 showing fluid flow.

A detailed study of the mechanism which causes this phenomenon to occur has been made and it appears that nozzles 32 and 34 set up a pair of side-by-side vortices within column 10 as a result of a transfer of momentum, and each vortex sets up a cooperating vortex directly beneath it, much as schematically illustrated in FIG. 3. Thus it has been found that the angle of nozzles 32 and 34 is very important. The smaller angle A is from vertical the more effective and efficient are the results. That is, the smaller angle A is, the less fluid velocity is required to reach down a given depth to pick off a particular layer of particles. Further, the velocities of the liquid emerging from nozzles 32 and 34 must be equal to each other in order to obtain uniform removal of particles.

Figure 4:
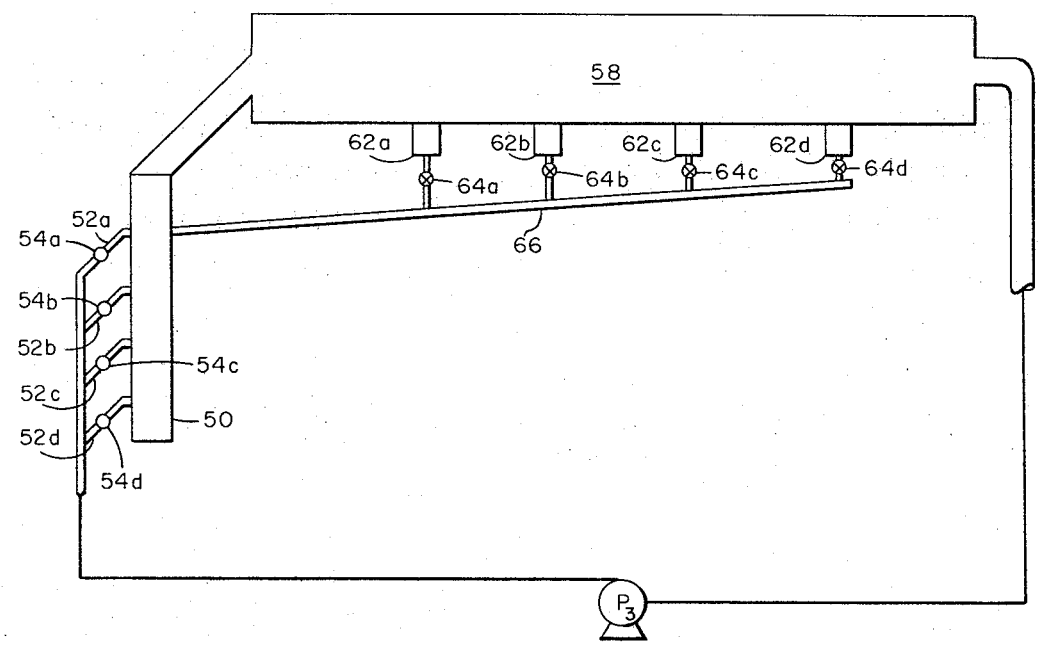
FIG. 4 is an assembly for the controlled unloading of a complete column and classification storage of the removed spherical elements.

In the arrangement of FIGS. 1 and 2, it was pointed out that by increasing the pressure of liquid supplied to nozzles 32 and 34 it is feasible to remove a whole bed, or a portion of a bed, one layer at a time. As it is readily apparent from the discussion of FIG. 3, the greater the distance the turbulent fluid acts through, the more damping takes place and somewhat less efficient the operation becomes. Referring to FIG. 4 there is illustrated a column 50 in which several side manifolds 52a, 52b, 52c and 52d are provided, each leading to nozzles (not shown) in the side walls of column 50. Each of the side manifolds is provided with a valve 54a, 54b, 54c, and 54d, respectively, which may be operated either manually or automatically in sequence. A pump $P_3$ supplies water or other liquid to the manifolds while the upper end of column 50 opens into a classifier 58 having a series of traps 62a, 62b, 62c, and 62d. Each of traps 62a–62d is provided with an opening at the bottom controlled by a valve 64a, 64b, 64c and 64d, respectively, leading to a manifold 66 sloped to return the particles to column 50 or to any other receptacle as desired (not shown). Thus, assuming column 50 to be filled with a packed bed of spherical particles and it is desired to remove these particles in the manner previously described, valve 54a in manifold 52a would be open and all the others closed. When the upper portion of the bed is removed, valve 54a would be closed and valve 54b opened. While this sequence takes place the pressure of the liquid is cycled in any known fashion to remove sequentially a series of particle layers for each valve opening as described earlier. Thus, the bed of particles in column 50 can be efficiently and effectively removed. Classifier 58 which receives the fluidized particles is designed to segregate the particles by position in column 50. Hence, the uppermost layers of the particles in column 50 will fill trap 62a and the next layers will fill trap 62b, etc. When column 50 is emptied of the particles and all of traps 62a–62d are filled, the particles can be returned to column 50 or delivered elsewhere in any rearrangement desired by the order in which traps 62a–62d are emptied through the control of valves 64a–64d. This arrangement for returning the particles is of course illustrative only as it may not be desired to return the particles to column 50.

It is thus seen that there has been provided a unique way to effect the controlled and selective unloading of an ordered packed bed of spherical particles by the use of hydraulics. While only preferred embodiments of the invention have been shown and described it is understood that many variations thereof may be made without departing from the principles of this invention. Hence the invention is not to be limited by the particular examples described but is to be defined only by the scope of the appended claim.

What is claimed is:

A nuclear fuel assembly comprisisng a vertically extending column containing an ordinarily stationary ordered bed of spherical fuel particles, at least one nozzle extending inwardly and upwardly through a side wall of said column above said bed of particles, and means for varying the flow of liquid supplied under pressure through said nozzle to fluidize selectively portions of said bed to permit the removal of said particles from said column in a predictable and orderly manner.

References Cited by the Examiner

UNITED STATES PATENTS

| | | | |
|---|---|---|---|
| 3,034,689 | 5/1962 | Stoughton et al. | 176—31 X |
| 3,039,945 | 6/1962 | Slack et al. | 176—45 X |
| 3,058,897 | 10/1962 | Slack et al. | 176—45 |
| 3,154,473 | 10/1964 | Martin | 176—45 X |
| 3,244,597 | 4/1966 | Tower | 176—45 X |

BENJAMIN R. PADGETT, *Primary Examiner.*

M. J. SCOLNICK, *Assistant Examiner.*